US010515600B2

(12) United States Patent
Park et al.

(10) Patent No.: US 10,515,600 B2
(45) Date of Patent: Dec. 24, 2019

(54) DRIVING OF A DISPLAY DEVICE WITH TEMPERATURE COMPENSATION

(71) Applicant: SAMSUNG DISPLAY CO., LTD., Yongin-Si, Gyeonggi-Do (KR)

(72) Inventors: Kiyong Park, Seoul (KR); Sangmin Kang, Hwaseong-si (KR); Kyungsik Kim, Suwon-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 10 days.

(21) Appl. No.: 15/900,373

(22) Filed: Feb. 20, 2018

(65) Prior Publication Data
US 2018/0240423 A1 Aug. 23, 2018

(30) Foreign Application Priority Data

Feb. 21, 2017 (KR) .................. 10-2017-0023142

(51) Int. Cl.
*G09G 3/36* (2006.01)
*G02F 1/1368* (2006.01)
*G02F 1/1362* (2006.01)

(52) U.S. Cl.
CPC ......... *G09G 3/3614* (2013.01); *G02F 1/1368* (2013.01); *G02F 1/136286* (2013.01); *G09G 3/3607* (2013.01); *G09G 3/3677* (2013.01); *G09G 3/3685* (2013.01); *G09G 3/3688* (2013.01); *G09G 2310/0251* (2013.01); *G09G 2310/066* (2013.01); *G09G 2310/08* (2013.01); *G09G 2320/0242* (2013.01); *G09G 2320/041* (2013.01)

(58) Field of Classification Search
CPC .. G09G 3/3614; G09G 3/3607; G09G 3/3685; G09G 3/3688; G09G 2310/0251; G09G 2310/066; G09G 2310/08; G09G 2320/0242; G09G 2320/041; G02F 1/136286; G02F 1/1368
See application file for complete search history.

(56) References Cited

U.S. PATENT DOCUMENTS

2010/0277519 A1* 11/2010 Lee .................. G09G 3/3406 345/691
2015/0255018 A1* 9/2015 Aoki ................. G09G 3/20 345/76
2018/0096650 A1* 4/2018 Pyeon ................ G09G 3/3233

FOREIGN PATENT DOCUMENTS

| KR | 10-0522642 | 10/2005 |
| KR | 10-0800192 | 1/2008 |
| KR | 10-0861921 | 9/2008 |

(Continued)

*Primary Examiner* — Lisa S Landis
(74) *Attorney, Agent, or Firm* — F. Chau & Associates, LLC

(57) ABSTRACT

A liquid crystal display device in which an inversion driving scheme is applied to a pixel array which shares data lines. The liquid crystal display device varies driving waveforms of gate signals or data signals according to temperature and may suppress a color deviation of a display panel attributable to inversion of polarities of data signals. A timing controller may be configured to apply control signals to a data drive circuit and a gate drive circuit, the control signals includes a slew rate control pulse that controls the data drive circuit to vary any one of a rising slew rate and a falling slew rate of the data signal corresponding to the main charge interval of each of the gate signals.

20 Claims, 15 Drawing Sheets

(56) References Cited

FOREIGN PATENT DOCUMENTS

| | | |
|---|---|---|
| KR | 10-0932306 | 12/2009 |
| KR | 10-0938326 | 1/2010 |
| KR | 10-1349007 | 1/2014 |
| KR | 10-1349010 | 1/2014 |
| KR | 10-1351937 | 1/2014 |
| KR | 10-1615765 | 4/2016 |

* cited by examiner

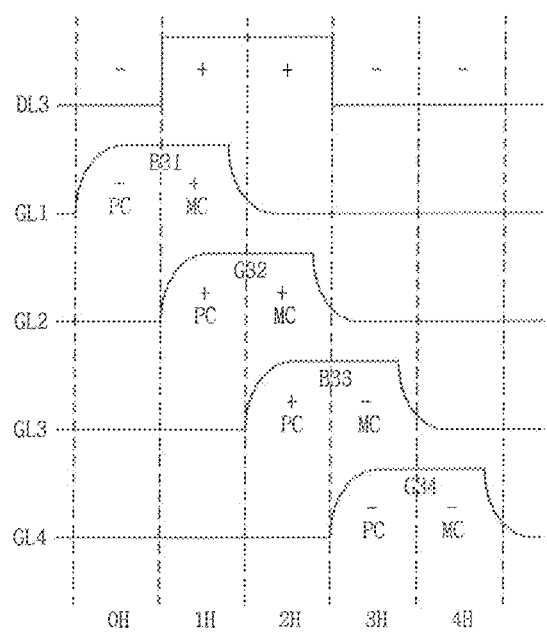

Fig. 8

|     | PC | MC | Pol       | Charge ratio | Color |
|-----|----|----|-----------|--------------|-------|
| R11 | −  | +  | inverted  | Low          | Red   |
| G12 | +  | +  | maintained | High        | Green |
| R13 | +  | −  | inverted  | Low          | Red   |
| G14 | −  | −  | maintained | High        | Green |
| R21 | +  | −  | inverted  | Low          | Red   |
| B22 | −  | −  | maintained | High        | Blue  |
| R23 | −  | +  | inverted  | Low          | Red   |
| B24 | +  | +  | maintained | High        | Blue  |
| B31 | −  | +  | inverted  | Low          | Blue  |
| G32 | +  | +  | maintained | High        | Green |
| B33 | +  | −  | inverted  | Low          | Blue  |
| G34 | +  | +  | maintained | High        | Green |

Fig. 13

|  | Pattern | REFERENCE | INVENTION |
|---|---|---|---|
| Logic Power Consumption | WHITE | 2.67 | 2.645 |
|  | BLACK | 6.02 | 5.085 |
|  | WHITE | 4.335 | 3.92 |
| E/S 7.0 Standard Power Consumption Reduction Rate | WHITE | 0% | 0.13% |
|  | BLACK | 0% | 5.04% |
|  | MOSAIC | 0% | 2.24% |

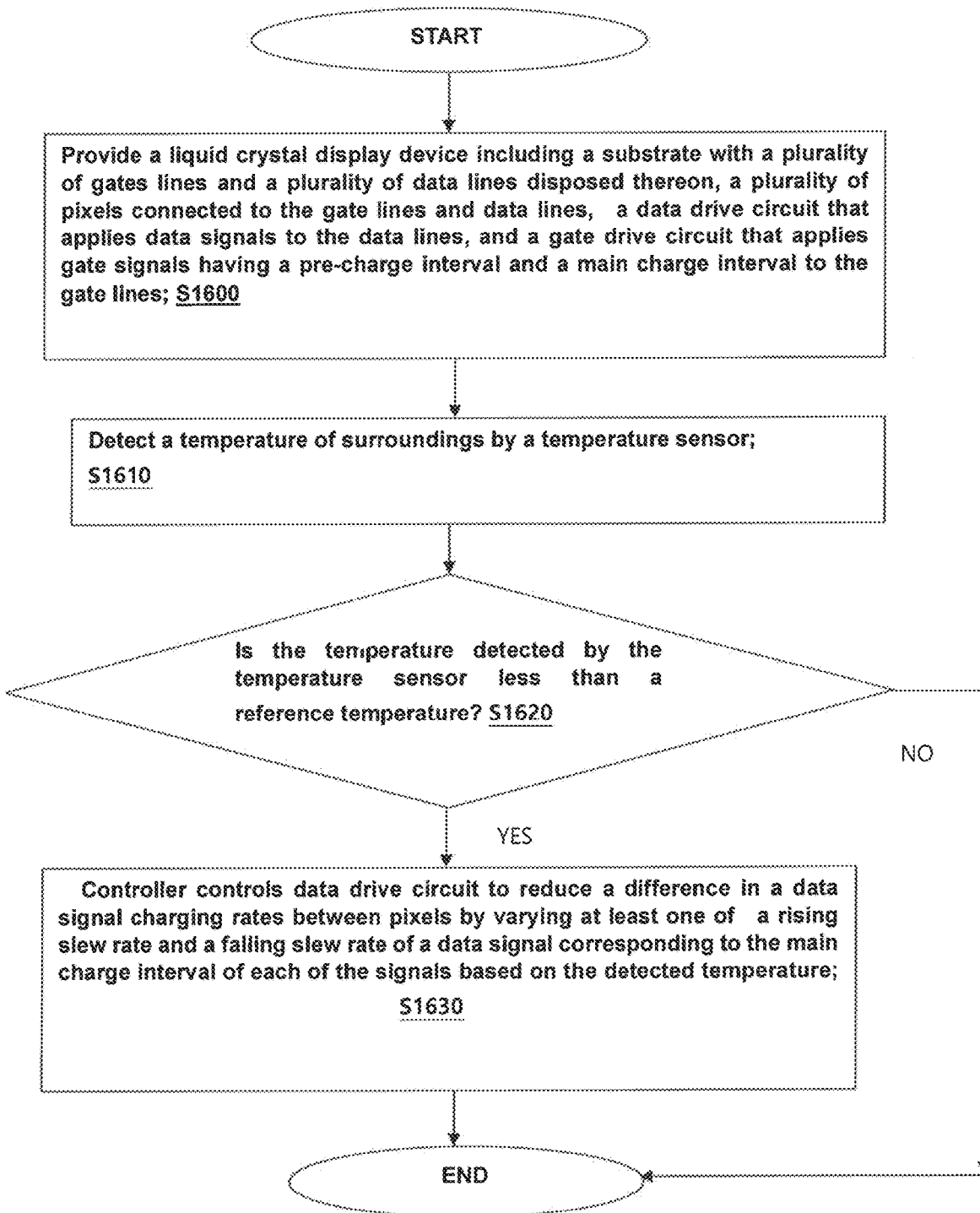

DRIVING OF A DISPLAY DEVICE WITH TEMPERATURE COMPENSATION

CROSS-REFERENCE TO RELATED APPLICATION

This application claims priority under 35 U.S.C. § 119 from Korean Patent Application No. 10-2017-0023142, filed on Feb. 21, 2017, in the Korean Intellectual Property Office (KIPO), the disclosure of which is incorporated by reference herein.

1. TECHNICAL FIELD

Embodiments of the inventive concept relate to the driving of a display device, which is capable of varying charging conditions of data voltages according to temperature.

2. DISCUSSION OF RELATED ART

An active matrix liquid crystal display device displays moving images by using thin film transistors (TFTs) as switching devices. A liquid crystal display device has essentially made devices with cathode ray tubes (CRT) obsolete at least because of reduced power usage and because liquid crystal display devices can be implemented in much smaller sizes than a cathode ray tube. Accordingly, such liquid crystal display devices are applied not only to displays for portable information devices, office devices, computers, etc. but also to televisions, and are rapidly replacing cathode ray tubes (CRTs).

A liquid crystal display device includes: a liquid crystal display panel; a backlight configured to radiate light onto the liquid crystal display panel; a data drive circuit configured to supply data voltages to data lines of the liquid crystal display panel; a gate drive circuit configured to supply scan pulses to gate lines (or scan lines) of the liquid crystal display panel; control circuits configured to control the drive circuits; a drive circuit configured to drive light sources of the backlight; a power supply circuit configured to generate analog drive voltages utilized for the liquid crystal display panel and voltages utilized for driving of the circuits; etc.

A liquid crystal display device displays an image by varying transparency based on differences in electric potential between data voltages supplied to pixel electrodes and a common voltage supplied to a common electrode. A liquid crystal display device is generally driven using an inversion driving scheme of periodically inverting polarities of data voltages to be applied to liquid crystals and may prevent the liquid crystals from being degraded.

Such a liquid crystal display device may lack a sufficient data charging time due to an increase in resolution or due to a pixel array structure. Furthermore, in a liquid crystal display device, response times of liquid crystals may become different due to temperature conditions or due to a data driving pattern, and thus differences in the amount of charged data may occur.

It is to be understood that in this discussion of the related art, the technology section discussed herein above is intended to provide a useful understanding of the technology and as such disclosed herein, the technology section may include ideas, concepts or recognitions that were not part of what was known or appreciated by those skilled in the pertinent art prior to a corresponding effective filing date of subject matter disclosed herein.

SUMMARY

Embodiments of the inventive concept may be directed to a liquid crystal display device and a method of driving the liquid crystal display device, which are capable of reducing a data signal charging deviation attributable to inversion driving in a low-temperature environment.

According to an embodiment of the inventive concept, there is provided a liquid crystal display device including: a substrate; a plurality of gate lines disposed on the substrate, and extending in a first direction; a plurality of data lines disposed on the substrate, and extending in a second direction which intersects the first direction; a plurality of pixels connected to the gate lines and the data lines; a data drive circuit configured to apply data signals, each having a positive polarity or negative polarity based on a predetermined voltage, to the plurality of data lines; a gate drive circuit configured to supply gate signals, each including a pre-charge interval and a main charge interval, to the plurality of gate lines; and a temperature sensor configured to detect a temperature of surroundings; wherein the data drive circuit varies at least any one of a rising slew rate and falling slew rate of a data signal corresponding to the main charge interval of each of the gate signals based on the temperature detected by the temperature sensor.

The pixels may form a j×k array (where j and k are positive integers), a number of data lines may be j/2, and a number of gate lines may be 2k; and the pixels may be arranged in the first direction in which the gate lines extend, and some adjacent ones of the pixels may receive data signals from a corresponding one of the data lines.

The pixels may be substantially consecutively arranged in the second direction in which the data lines extend; every two or more of the gate lines may be disposed between the pixels arranged in the direction in which the data lines extend; and each of the gate lines may apply gate signals to adjacent ones of the pixels.

When the temperature detected by the temperature sensor is lower than a reference temperature, the data drive circuit may output a data signal having a rising slew rate lower than a rising slew rate of the reference temperature in the main charge interval.

When the temperature detected by the temperature sensor is lower than a reference temperature, the data drive circuit may output a data signal having a falling slew rate lower than a falling slew rate of the reference temperature in the main charge interval.

The rising slew rate and the falling slew rate may have different values.

According to an embodiment of the inventive concept, there is provided a liquid crystal display device including: a substrate; a plurality of gate lines disposed on the substrate, and extending in a first direction; a plurality of data lines disposed on the substrate, and extending in a second direction which intersects the first direction; a data drive circuit configured to apply data signals, each having a positive polarity or negative polarity based on a predetermined voltage, to the plurality of data lines; a gate drive circuit configured to supply gate signals, each including a pre-charge interval and a main charge interval, to the plurality of gate lines; and a temperature sensor configured to detect a temperature of surroundings; wherein the gate drive circuit varies a falling slew rate of a gate signal corresponding to the main charge interval of each of the gate signals based on the temperature detected by the temperature sensor.

When a resolution of pixels of the liquid crystal display device is j×k (where j and k are positive integers), a number of data lines may be j/2, and a number of gate lines may be 2k; the pixels may include red pixels, green pixels, and blue pixels; and the pixels may be arranged in the direction in which the gate lines extend, and some adjacent ones of the pixels may receive data signals from a corresponding one of the data lines.

The pixels may be arranged in the direction in which the data lines extend; every two of the gate lines may be disposed between the pixels arranged in the direction in which the data lines extend; and each of the gate lines may apply gate signals to adjacent ones of the pixels.

When the temperature detected by the temperature sensor is lower than a reference temperature, the gate drive circuit may output a gate signal having a falling slew rate lower than a falling slew rate of the reference temperature in the main charge interval.

The gate drive circuit may output a gate signal having a falling slew rate which decreases as the temperature detected by the temperature sensor is lower.

The data drive circuit may output a data signal having a rising slew rate lower than a rising slew rate of the reference temperature in the main charge interval of the gate signal.

According to an embodiment of the inventive concept, there is provided a liquid crystal display device including: a substrate; a plurality of gate lines disposed on the substrate, and extending in a first direction; a plurality of data lines disposed on the substrate, and extending in a second direction which intersects the first direction; a data drive circuit configured to apply data signals, each of the data signals having a positive polarity or negative polarity based on a predetermined voltage, to the plurality of data lines; a gate drive circuit configured to supply gate signals, each of the data signals including a pre-charge interval and a main charge interval, to the plurality of gate lines; and a timing controller configured to apply control signals to the data drive circuit and the gate drive circuit; and a temperature sensor including a resistor having a resistance value which varies with a temperature, the sensor configured to detect a temperature of surroundings, and to transmit the detected temperature to the timing controller;

wherein the timing controller further includes: a floating circuit including a differential amplifier configured to receive a voltage determined based on the resistance value and to output a slew rate control pulse; and a signal output circuit configured to block an output of a gate signal or data signal which overlaps the slew rate control pulse.

The differential amplifier may include at least two input terminals and one output terminal; and one of the input terminals may be connected to the temperature sensor, and a remaining one of the input terminals may be connected to the output terminal in a feedback arrangement.

The signal output circuit may include a switching device connected to an output terminal for the gate signal or data signal; and a first terminal of the switching device may be connected to a node to receive the slew rate control pulse, and a second terminal of the switching device may be connected to the output terminal for the gate signal or data signal, and a third terminal of the switching device may be connected to a ground power supply.

According to an embodiment of the inventive concept, a timing controller is configured to apply control signals to the data drive circuit and the gate drive circuit, the control signals includes a slew rate control pulse that controls the data drive circuit to vary any one of the rising slew rate and the falling slew rate of the data signal corresponding to the main charge interval of each of the gate signals.

According to an embodiment of the inventive concept, the temperature sensor includes a Resistance Temperature Detector (RTD) comprising a metal resistor.

According to an embodiment of the inventive concept, the data drive circuit is configured to operate an inversion driving scheme in which two positive data signals or two negative data signals are successively applied, in which a second one of the successively applied data signals has a longer period of transition from a high electric potential to a low electric potential than a first one of the successively applied data signals.

BRIEF DESCRIPTION OF THE DRAWINGS

An appreciation of the inventive concept by a person of ordinary skill in the art will become more apparent by describing in detail embodiments thereof with reference to the accompanying drawings, wherein:

FIG. 7a is a diagram illustrating a write sequence of data signals which are written to a pixel array;

FIG. 7b is a graph illustrating waveforms of data signals which are written to the pixel array;

FIG. 8 is a table of pixel charging conditions based on waveforms illustrated in FIGS. 5a to 7b;

FIG. 13 is a table illustrating comparisons between power consumption of the conventional inversion driving scheme and power consumption of the driving method according to an embodiment of the inventive concept;

FIG. 16 is a flowchart providing an overview of operation according to an embodiment of the inventive concept.

DETAILED DESCRIPTION

Figure 1:
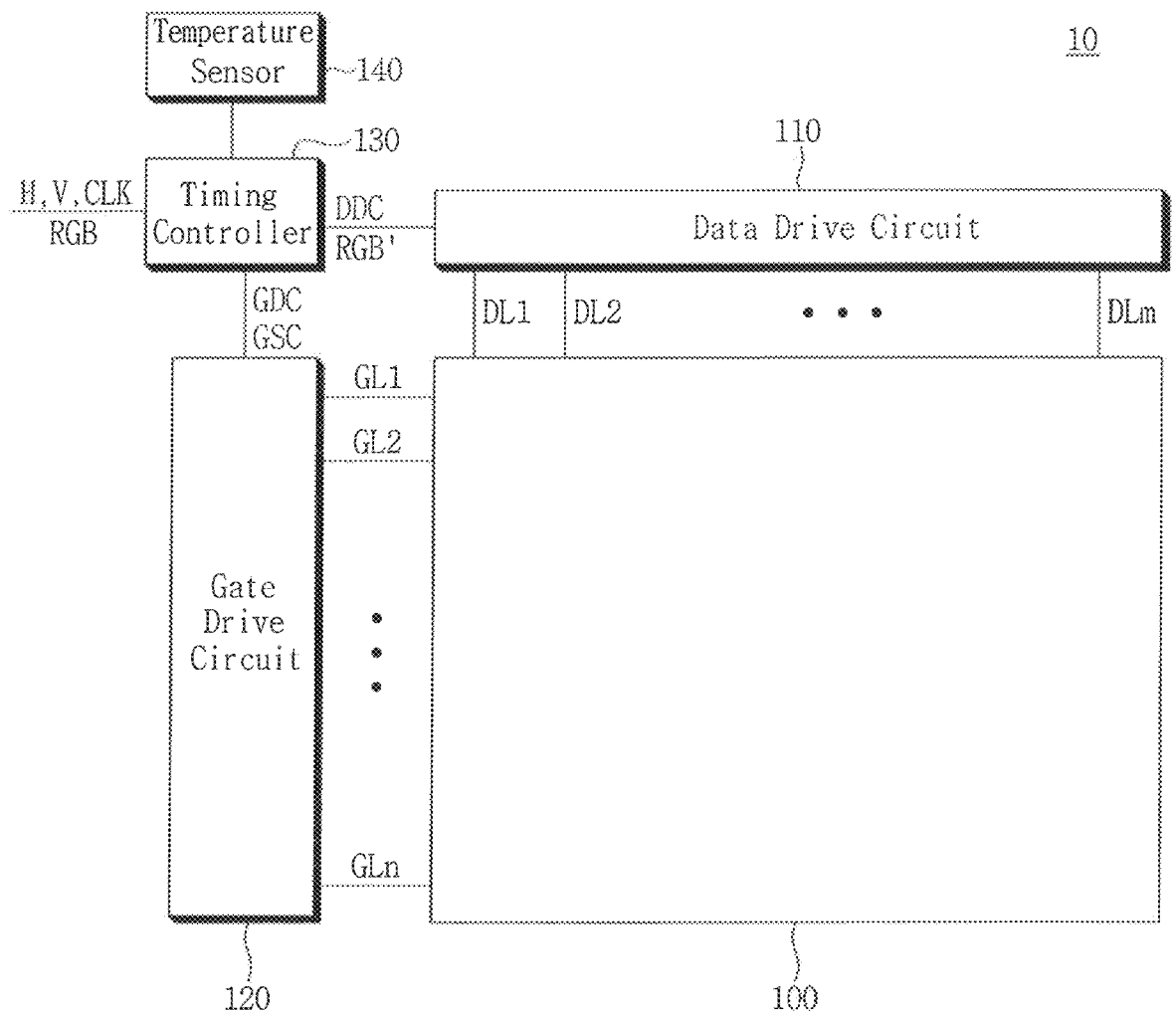
FIG. 1 is a diagram illustrating a configuration of a display device according to an embodiment of the inventive concept.

Advantages and features of the inventive concept and methods for achieving them will be made clear from embodiments described below in detail with reference to the accompanying drawings. The inventive concept may, however, be embodied in many different forms and should not be construed as being limited to the embodiments set forth herein. Rather, these embodiments are provided so that this disclosure will be thorough and complete, and will fully convey the scope of the present disclosure to those skilled in the art. The inventive concept is merely defined by the scope of the claims. Therefore, well-known constituent elements, operations, and techniques may not be described in detail in the embodiments to prevent the inventive concept from being obscurely interpreted. Like reference numerals refer to like elements throughout the specification.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

Throughout the present disclosure, the term "room-temperature" refers to a temperature in a range of 15 to 25° C., the term "low-temperature" refers to a temperature lower than the room temperature, and the term "high-temperature" refers to a temperature higher than the room temperature.

Unless otherwise defined, all terms used herein (including technical and scientific terms) have the same meaning as commonly understood by those skilled in the art to which the inventive concept pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

FIG. 1 is a diagram illustrating a configuration of a liquid crystal display device 10 according to an embodiment of the inventive concept.

As illustrated in FIG. 1, the liquid crystal display device 10 according to the present embodiment includes a display panel 100, a data drive circuit 110, a gate drive circuit 120, a timing controller (T-CON) 130, and a temperature sensor 140.

Although not illustrated in the drawing, the liquid crystal display device 10 including the display panel 100 may further include: a backlight (not illustrated) configured to provide light to the display panel 100; and a pair of polarizers (not illustrated). Furthermore, the display panel 100 may be any one of a vertical alignment (VA) mode panel, a patterned vertical alignment (PVA) mode panel, an in-plane switching (IPS) mode panel, a fringe-field switching (FFS) mode panel, and a plane to line switching (PLS) mode panel, and is not limited to a specific mode panel.

The display panel 100 (shown in FIG. 1) may include: a plurality of gate lines GL1 to GLn; a plurality of data lines DL1 to DLm configured to be insulated from and intersect the plurality of gate lines GL1 to GLn; and a plurality of pixels PX electrically connected to the plurality of gate lines GL1 to GLn and the plurality of data lines DL1 to DLm. The plurality of gate lines GL1 to GLn are connected to the gate drive circuit 120, and the plurality of data lines DL1 to DLm are connected to the data drive circuit 110.

The data drive circuit 110 may include a plurality of data driving integrated circuits (ICs) (not illustrated). The data drive circuit 110 receives a digital image data signal RGB' and a data driving control signal DDC from the timing controller 130. The data drive circuit 110 samples the digital image data signal RGB' in response to receiving the data driving control signal DDC, latches sampling image data signals corresponding to one horizontal line in each horizontal period, and supplies the latched data signals to the data lines DL1 to DLm.

The gate drive circuit 120 receives a gate driving control signal GDC and a gate shift clock GSC from the timing controller 130. The gate drive circuit 120 sequentially generates gate signals in response to the gate driving control signal GDC and the gate shift clock GSC, and supplies the gate signals to the gate lines GL1 to GLn.

The timing controller 130 supplies a digital image signal RGB' based on receiving an externally-applied digital image data signal RGB to the data drive circuit 110, and the timing controller 130 generates a data driving control signal DDC and a gate driving control signal GDC by using horizontal and vertical synchronization signals H and V in response to a clock signal CLK, and supplies the data driving control signal DDC and the gate driving control signal GDC to the data drive circuit 110 and the gate drive circuit 120, respectively. In this case, the data driving control signal DDC may include, for example, a source shift clock, a source start pulse, a data output enable signal, and the like, and the gate driving control signal GDC may include a gate start pulse, a gate output enable signal, and the like.

The temperature sensor 140 is configured to detect a temperature of the display panel 100 and a drive circuit (e.g., a gate drive circuit, a data drive circuit), or a temperature of the display panel 100. The temperature detected by the temperature sensor 140 is converted into an electric signal and transmitted to the timing controller 130, and the timing controller 130 outputs a control signal for a data signal or gate signal so that gamma and luminance correction are performed based on the detected temperature. Furthermore, the timing controller 130 generates a slew rate control pulse based on the detected temperature, and may further include a slew rate control circuit configured to control rising and falling slew rates of a data or gate signal in response to the slew rate control pulse, and a signal output circuit. The temperature sensor 140 may include a metal resistor a resistance value of which varies with a variation in temperature (e.g. a resistance temperature detector). The known change in the resistive value corresponds to changes in the temperature. The temperature sensor may include, for example, a Resistance Temperature Detector (RTD), which may use the metal resistor. It is also possible within the broad scope of the inventive concept, that, for example, a Negative Temperature Coefficient (NTC) type, and/or a Positive Temperature Coefficient (PTC) type could be used if a ceramic or polymer was used as a thermistor material.

Figure 2:
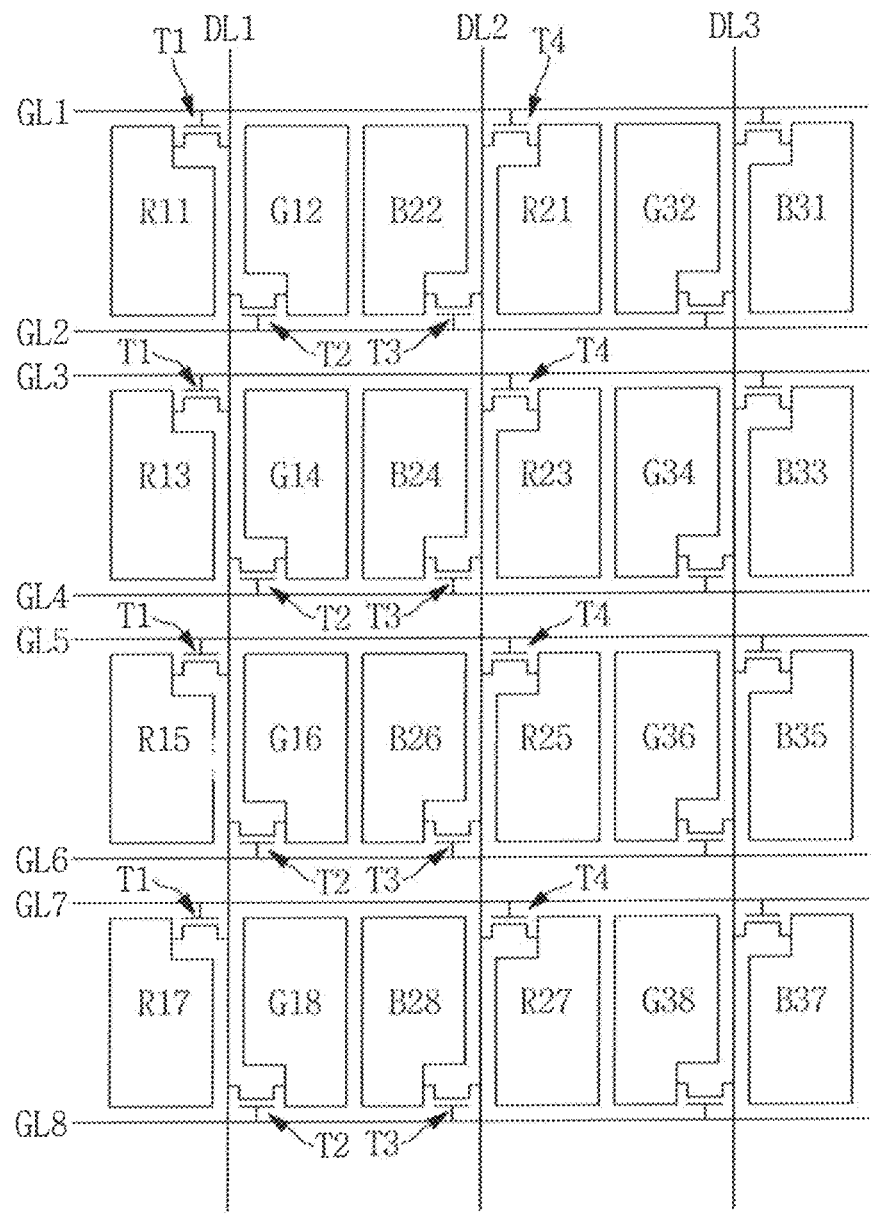
FIG. 2 is a plan view illustrating a pixel structure according to an embodiment of the inventive concept.

FIG. 2 is a plan view illustrating a pixel structure according to an embodiment of the inventive concept.

Referring to FIG. 2, in a pixel array is disposed in a display panel 100, each of the plurality of pixels in this example shows a repeated sequence of a red pixel R, a green pixel G, and a blue pixel B arranged in a direction in which the data lines DL1, DL2, and DL3 extend. Pixels adjacent to each other in a lateral direction in the pixel array share a corresponding one of the data lines DL1, DL2, and DL3, and are charged with data signals supplied by the corresponding one of the data lines DL1, DL2, and DL3.

As shown in FIG. 2, a symbol which denotes each pixel includes an alphabet letter representative of a corresponding color, a serial number of a corresponding data line, and a serial number of a corresponding gate line. For example, the symbol "R11" denotes a red pixel which is connected to a first data line DL1 and a first gate line GL1. The red pixel R11 includes a first TFT T1. The first TFT T1 included in the red pixel R11 is turned on by the first gate line GL1, and charges a pixel capacitor (not illustrated) of the pixel R11 with a data signal applied through the first data line DL.

A green pixel G12 is adjacent to the red pixel R11 in a lateral direction (e.g., in a direction in which the gate lines extend), and includes a second TFT T2 connected to the first data line DL1 and a second gate line GL2. A blue pixel B22, which is adjacent to the green pixel G12 in the lateral direction, is connected by a third TFT T3 to the second data line DL2 and the second gate line GL2. The display panel 100 may display colors by combining light outputs of individual primary colors, which are displayed by the red pixel R11, the green pixel G12, and the blue pixel B22.

Furthermore, the pixel array is repeatedly formed. For example, there may be a sequence of RGB pixels that repeats (see R21, G32, B31). A red pixel R21 is disposed adjacent to a blue pixel B22 in a lateral direction. The red pixel R21 is connected to the second data line DL2 and the first gate line GL1 via a fourth TFT T4.

Each of the red pixel, the green pixel, and the blue pixel is successively arranged in columns in a vertical direction (a direction in which the data lines extend). In the pixel array, every two or more of the gate lines are located between adjacent two pixels in the vertical direction. For example, the second gate line GL2 and a third gate line GL3 may be disposed between the red pixel R11 in a first row and a red pixel R13 in a second row. In addition, the fourth gate line GL4 and the fifth gate line GL5 may be disposed between the red pixel R13 in the second row, and the red pixel R15 in the third row.

The second gate line GL2 and the third gate line GL3 are connected to transistors of pixels adjacent in the vertical direction.

The pixel array as illustrated in FIG. 2 is a pixel structure which may reduce a number of data wirings by half. When a pixel array includes j×k pixels, j/2 data lines DLm are utilized, and 2k gate lines GLn are utilized.

Figure 3:
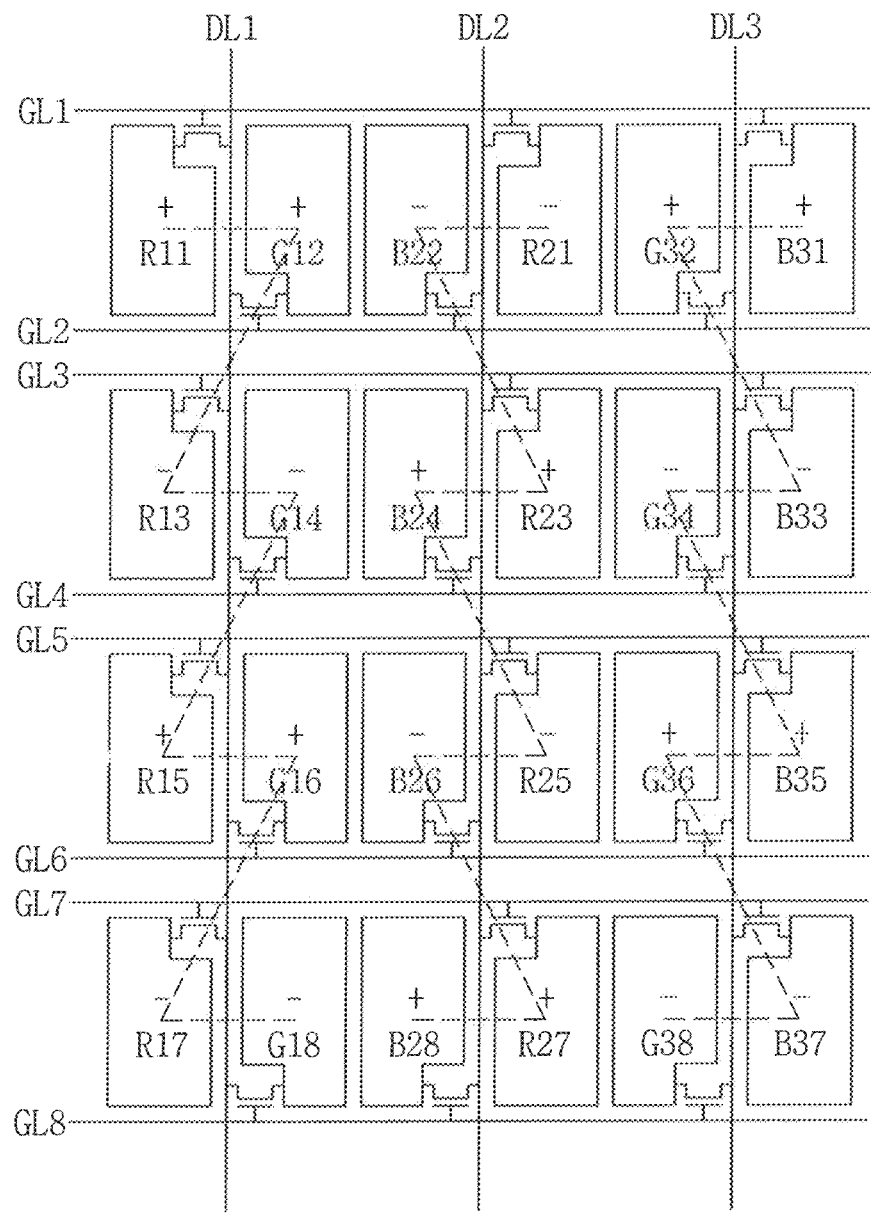
FIG. 3 is a diagram illustrating a data charging sequence of a pixel array according to an embodiment of the inventive concept.

FIG. 3 is a diagram illustrating a data charging sequence of a pixel array according to an embodiment of the inventive concept.

Referring now to FIG. 3, the display panel (see 100 of FIG. 1) according to the embodiment of the inventive concept may be driven using an inversion driving scheme. The inversion driving scheme comprises inverting a phase of a data signal, to be applied to each of a plurality of pixels included in the display panel 100, at a predetermined period (for example, for every pixel column) based on a common voltage. Characteristics of liquid crystals may be prevented from being degraded by the inversion driving scheme.

The display panel 100 according to the present embodiment may be driven based on a scheme of inverting voltage polarities of data signals for every two successively applied data signals. The symbol "+" indicates that an applied data signal has a voltage higher than the common voltage, and is referred to as having a positive polarity. In contrast, the symbol "−" indicates that a data signal has a voltage lower than the common voltage, and is referred to as having a negative polarity. For example, as illustrated in FIG. 3, in a first frame, data signals having "+, +, −, −, +, and +" polarities are sequentially applied to pixels in first and third rows. Data signals having "−, −, +, +, −, and −" polarities are sequentially applied to pixels in second and fourth rows. Furthermore, although not illustrated in the drawing, in a second frame applied after the first frame, data signals having "−, −, +, +, −, and −" polarities may be applied to the pixels in the first and third rows, and data signals having "+, +, −, −, +, and +" polarities may be applied to the pixels in the second and fourth rows.

As to a data write sequence of the pixel array, first, in pixel columns of a first row, a positive data signal, a negative data signal, and a positive data signal are simultaneously applied to a red pixel R11, a red pixel R21, and a blue pixel B31 connected to a first gate line GL1, respectively. Thereafter, in the pixel columns of the first row, a positive data signal, a negative data signal, and a positive data signal are simultaneously applied to a green pixel G12, a blue pixel B22, and a green pixel G32 connected to a second gate line GL2, respectively.

When data has been written in the pixel columns of the first row, a negative data signal, a positive data signal, and a negative data signal are simultaneously applied to a red pixel R13, a red pixel R23, and a blue pixel B33 connected to a third gate line GL3, respectively, in pixel columns of a second row. In the pixel columns of the second row, a negative data signal, a positive data signal, and a negative data signal are simultaneously applied to a green pixel G14, a blue pixel B24, and a green pixel G34 connected to a gate line GL4, respectively.

Since descriptions of charging sequences in pixel columns of third and fourth rows are the same as those in the pixel columns of the first and second rows, the discussion regarding the application of a positive data signal and a negative data signal are omitted. In brief, data signals are applied along dashed lines illustrated in FIG. 3.

Referring again to FIG. 3, for every two pixels sharing a data line DL, polarities of data signals are the same in the same row, and polarities of data signals are inverted into polarities opposite to those in a previous row of pixel columns when a row of pixel columns is changed.

Figure 4:
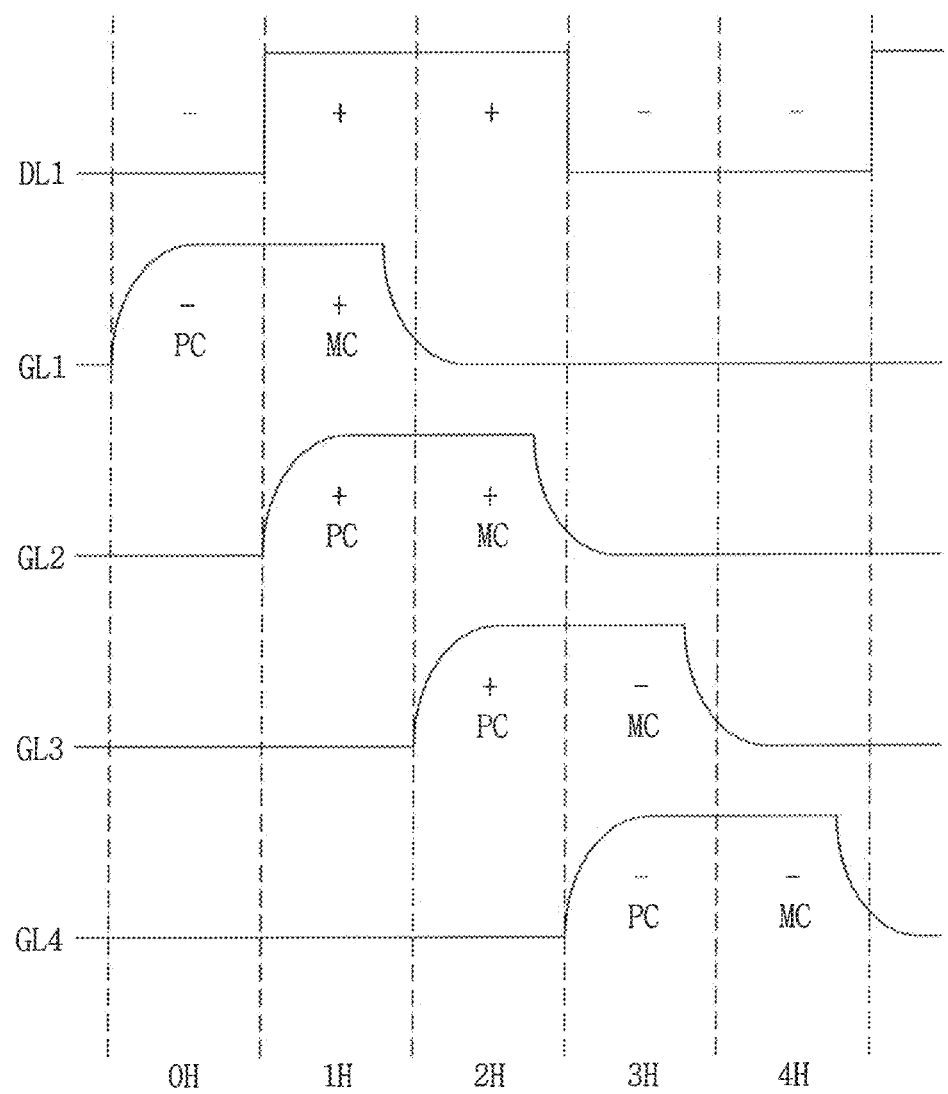
FIG. 4 is a graph illustrating waveforms of gate signals and data signals according to an inversion driving scheme.

FIG. 4 is a graph illustrating waveforms of gate signals and data signals according to an inversion driving scheme.

In charge sharing, a gate signal including a pre-charge interval PC and a main charge interval MC is applied. Each of the pre-charge interval PC and the main charge interval MC is set for each horizontal synchronization period H, and the pre-charge interval PC is disposed before the main charge interval MC. The gate signal turns on a transistor of a pixel in the pre-charge interval PC. The gate signal turns on the transistor of the pixel in advance in the pre-charge interval PC so that the pixel is charged with a data signal in the main charge interval MC.

FIG. 4 illustrates gate signals which are sequentially applied over a period 0H to a period 4H.

Referring again to FIG. 4, when it is assumed that all pixels connected to a first data line DL1 emit light, data signals applied through the first data line DL1 have polarities which are inverted in a sequence of "−, +, +, −, and −" over a period from the period 0H to the period 4H, and gate signals are sequentially applied to first to fourth gate lines GL1 to GL4.

In the period 0H, a gate signal in a pre-charge interval PC is applied to the first gate line GL1. The pre-charge interval PC corresponds to a negative data signal. Although a data signal is not applied in a more accurate sense, a description is given with it being considered that a negative data signal is applied for ease of description.

In the period 1H, a gate signal in a main charge interval MC is applied to the first gate line GL1, and capacitors of pixels connected to the first gate line GL1 are charged with the data signal of the first data line DL1. In the following, the charging of capacitors of pixels will be described as charging of the pixels for the sake of brevity. In this case, data signals which are applied in the pre-charge interval PC and main charge interval MC of the first gate line GL1 have different polarities, and the pixels are charged with a negative data signal in the pre-charge interval PC and are charged with a positive data signal in the main charge interval MC. In this case, the data signal with which the pixels are charged in the pre-charge interval PC is a data signal of previous pixels, and the data signal with which the pixels are charged in the main charge interval MC is a data signal which corresponds to luminance information of the actual corresponding pixels.

When polarities of the data signals written in the pre-charge interval PC and the main charge interval MC are opposite, a variation in voltage with which the pixels are charged is large, with the result that the pixels may not be fully charged and the quality of the display may be adversely affected. In particular, when one horizontal synchronization period H is short (as in the case of a high-resolution display panel, or when an electron transfer characteristic of transistors becomes poor due to a lower temperature environment), then a charging rate of the pixels may be further decreased.

In the period 2H, when a gate signal in a main charge interval MC is applied to the second gate line GL2, the pixels connected to the second gate line GL2 receive a positive data signal through the first data line DL1. The pixels connected to the second gate line GL2 receive positive data signals both in the pre-charge interval PC and in the main charge interval MC, a variation in voltage with which the pixels are charged in the main charge interval MC is small. Accordingly, the pixels connected to the second gate line GL2 may be fully charged with the received data signals during the main charge interval MC. In the period 2H, a gate signal in a pre-charge interval PC is applied to the third gate line GL3 at the same time that the gate signal in the main charge interval MC is applied to the second gate line GL2.

In the period 3H, a gate signal in a main charge interval MC is applied to the third gate line GL3, and a gate signal in a pre-charge interval PC is applied to the fourth gate line GL4. In this case, a negative data signal is applied to the first data line DL1.

In the period 4H, a gate signal in a main charge interval MC is applied to the fourth gate line GL4, and a negative data signal is applied to the first data line DL1.

Referring to FIG. 4, the data signal has a "−" polarity in the pre-charge interval PC of the gate signal applied to the first gate line GL1, and a polarity of the data signal is inverted into a "+" polarity in the main charge interval MC. The data signal has a "+" polarity in the pre-charge interval PC of the gate signal applied to the second gate line GL2, and the data signal maintains the "+" polarity in the main charge interval MC. The data signal has a "+" polarity in the pre-charge interval PC of the gate signal applied to the third gate line GL3, and a polarity of a data signal is inverted into a "−" polarity in the main charge interval MC. The data signal has a "−" polarity in the pre-charge interval PC of the gate signal applied to the fourth gate line GL4, and a data signal maintains the "−" polarity in the main charge interval MC.

In other words, the data signals synchronized with the pre-charge interval PC and main charge interval MC of the gate signal have the same polarity in the even-numbered gate line, and have inverted polarities in the odd-numbered gate line.

When the polarity of the data signal is inverted in the main charge interval MC, the pixels have a low data signal charging rate. When the pixels are not fully charged with the data signal, the pixels emit light at a low luminance. In other words, a difference in charging rates between the pixels connected to the even-numbered gate line and the pixels connected to the odd-numbered gate line occurs, and thus a difference in luminance occurs in the pixels according to a location of the gate line.

Figures 5A, 5B:
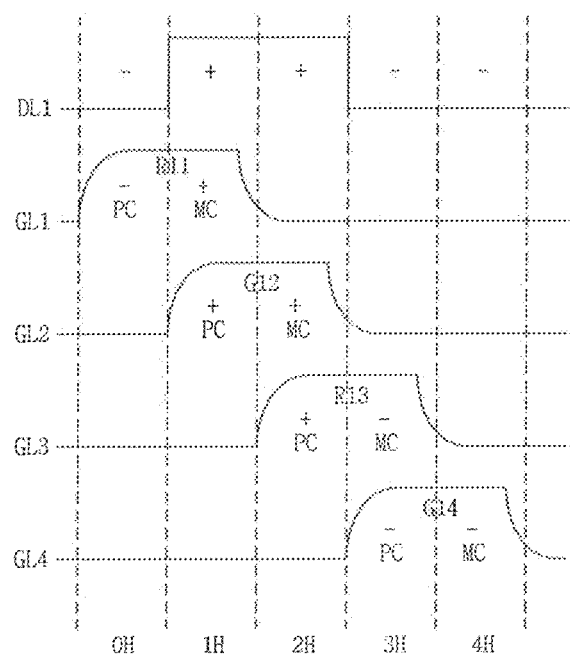
FIG. 5a is a diagram illustrating a write sequence of data signals which are written to a pixel array.
FIG. 5b is a graph illustrating waveforms of data signals which are written to the pixel array.

FIG. 5a is a diagram illustrating a write sequence of data signals which are written to a pixel array.

FIG. 5b is an illustration of waveforms of data signals which are written to the pixel array.

Referring now to FIGS. 5a and 5b, in the illustrated pixel array, data signals having "−, +, +, −, and −" polarities are applied to a first data line DL1 over a horizontal synchronization period from a period 0H to a period 4H.

In the period 0H, a gate signal in a pre-charge interval PC is applied to a first gate line GL1, and a negative data signal is applied to the first data line DL1. A red pixel R11 is charged with the negative data signal.

In the period 1H, a gate signal in a main charge interval MC is applied to the first gate line GL1, and a positive data signal is applied to the first data line DL1. The red pixel R11 connected to the first data line DL1 and the first gate line GL1 is charged with the positive data signal. The red pixel R11 is charged with the negative data signal in the pre-charge interval PC, and is recharged with the positive data signal in the main charge interval MC. In the period 1H, a gate signal in a pre-charge interval PC is applied to a second gate line GL2.

In the period 2H, a gate signal in a main charge interval MC is applied to the second gate line GL2, and a positive data signal is applied to the first data line DL1. A green pixel G12 connected to the first data line DL1 and the second gate line GL2 is charged with the positive data signal. The green pixel G12 is charged with positive data signals both in the pre-charge interval PC and in the main charge interval MC. In the period 2H, a gate signal in a pre-charge interval PC is applied to the third gate line GL3.

In the period 3H, a gate signal in a main charge interval MC is applied to the third gate line GL3, and a negative data signal is applied to the first data line DL1. A red pixel R13 connected to the first data line DL1 and the third gate line GL3 is charged with the negative data signal. The red pixel R13 is charged with a positive data signal in the pre-charge interval PC, and is charged with the negative data signal in the main charge interval MC. In the period 3H, a gate signal in a pre-charge interval PC is applied to a fourth gate line GL4.

In the 4H period, a gate signal in a main charge interval MC is applied to the fourth gate line GL4, and a negative data signal is applied to the first data line DL1. A green pixel G14 connected to the first data line DL1 and the fourth gate line GL4 is charged with the negative data signal. The green pixel G14 is charged with negative data signals both in the pre-charge interval PC and in the main charge interval MC.

Figure 6A:
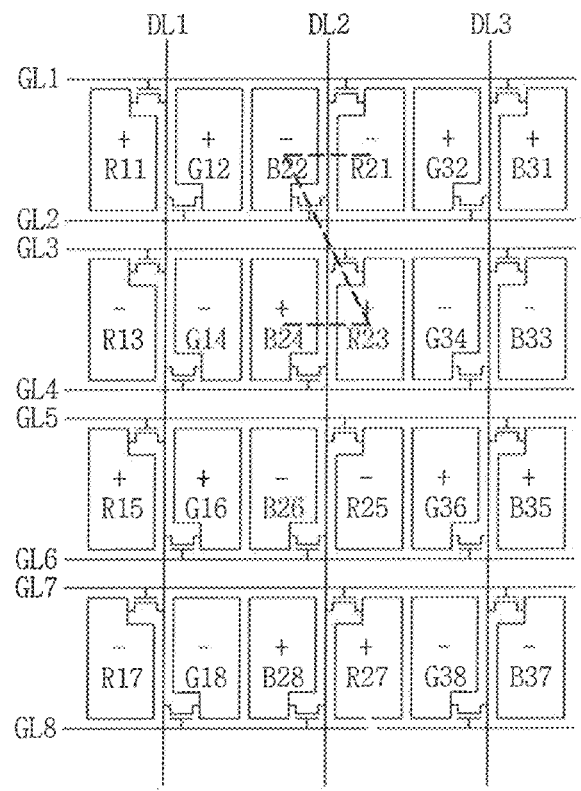
FIG. 6a is a diagram illustrating a write sequence of data signals which are written to a pixel array.

FIG. 6a is a diagram illustrating a write sequence of data signals which are written to a pixel array.

Figure 6B:
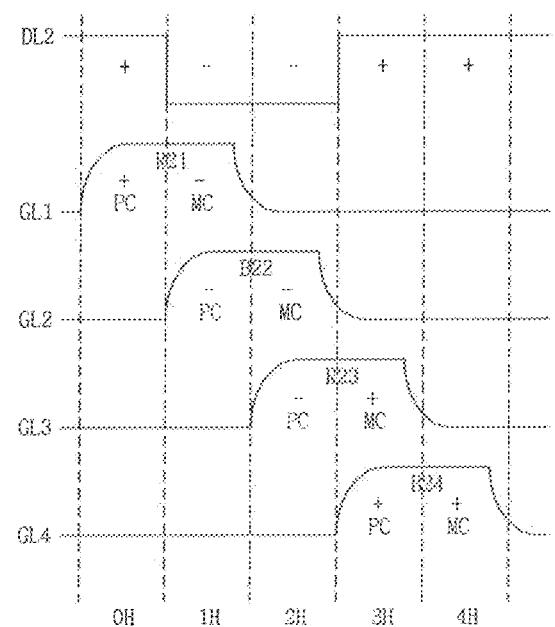
FIG. 6b is a graph illustrating waveforms of data signals which are written to the pixel array.

FIG. 6b is an illustration of waveforms of data signals which are written to the pixel array.

Referring to FIGS. 6a and 6b, in an illustrated pixel array, data signals having "+, −, −, +, and +" polarities are applied to a second data line DL2 during a horizontal synchronization period from an interval 0H to an interval 4H.

In the interval 0H, a gate signal in a pre-charge interval PC is applied to a first gate line GL1, and a polarity of a data signal applied to the second data line DL2 is positive.

In the period 1H, a gate signal in a main charge interval MC is applied to the first gate line GL1, and a negative data signal is applied to the second data line DL2. A red pixel R21 connected to the second data line DL2 and the first gate line GL1 is charged with the negative data signal. The red pixel R21 is charged with a positive data signal in a pre-charge interval PC, and is charged with the negative data signal in the main charge interval MC. In the period 1H, a gate signal in a pre-charge interval PC is applied to a second gate line GL2.

In the period 2H, a gate signal in a main charge interval MC is applied to the second gate line GL2, and a negative data signal is applied to the second data line DL2. A blue pixel B22 connected to the second data line DL2 and the second gate line GL2 is charged with the negative data signal. The blue pixel B22 is charged with negative data signals both in a pre-charge interval PC and in the main charge interval MC. In the period 2H, a gate signal in a pre-charge interval PC is applied to a third gate line GL3.

In the period 3H, a gate signal in a main charge interval MC is applied to the third gate line GL3, and a positive data signal is applied to the second data line DL2. A red pixel R23 connected to the second data line DL2 and the third gate line GL3 is charged with the positive data signal. The red pixel R23 is charged with a negative data signal in a pre-charge interval PC, and is charged with the positive data signal in the main charge interval MC. In the period 3H, a gate signal in a pre-charge interval PC is applied to a fourth gate line GL4.

In the 4H period, a gate signal in a main charge interval MC is applied to the fourth gate line GL4, and a positive data signal is applied to the second data line DL2. A blue pixel B24 connected to the second data line DL2 and the fourth gate line GL4 is charged with the positive data signal. The blue pixel B24 is charged with positive data signals in the pre-charge interval PC and in the main charge interval MC.

FIG. 7a is a diagram illustrating a write sequence of data signals which are written to a pixel array.

FIG. 7b is an illustration of waveforms of data signals which are written to the pixel array.

Referring to FIGS. 7a and 7b, in an illustrated pixel array, data signals having "−, +, +, −, and −" polarities are applied to a third data line DL3 during a horizontal synchronization period from a period 0H to a period 4H.

In the interval 0H, a gate signal in a pre-charge interval PC is applied to a first gate line GL1, and a negative data signal is applied to the third data line DL3.

In the period 1H, a gate signal in a main charge interval MC is applied to the first gate line GL1, and a positive data signal is applied to the third data line DL3. A blue pixel B31 connected to the third data line DL3 and the first gate line GL1 is charged with the positive data signal. In the period 1H, a gate signal in a pre-charge interval PC is applied to a second gate line GL2.

In the period 2H, a gate signal in a main charge interval MC is applied to the second gate line GL2, and a positive data signal is applied to the third data line DL3. A green pixel G32 connected to the third data line DL3 and the second gate line GL2 is charged with the positive data signal. In the period 2H, a gate signal in a pre-charge interval PC is applied to a third gate line GL3.

In the period 3H, a gate signal in a main charge interval MC is applied to the third gate line GL3, and a negative data signal is applied to the third data line DL3. A blue pixel B33 connected to the third data line DL3 and the third gate line GL3 is charged with the negative data signal. The blue pixel B33 is charged with a positive data signal in a pre-charge interval PC, and is charged with the negative data signal in the main charge interval MC. In the period 3H, a gate signal in a pre-charge interval PC is applied to a fourth gate line GL4.

In the 4H period, a gate signal in a main charge interval MC is applied to the fourth gate line GL4, and a negative data signal is applied to the third data line DL3. A green pixel G34 connected to the third data line DL3 and the fourth gate line GL4 is charged with the negative data signal. The green pixel G34 is charged with negative data signals in the pre-charge interval PC and the main charge interval MC.

FIG. 8 is a table of pixel charging conditions based on the waveforms illustrated in FIGS. 5a to 7b.

Referring to FIG. 8, red pixels R11, R13, R21, and R23 are connected to odd-numbered gate lines GL1, and GL3, and green pixels G12, G14, G32, and G34 are connected to even-numbered gate lines GL2, and GL4. Polarities Pol of data signals are inverted in pre-charge and main charge intervals PC and MC of a gate signal which is applied to each of the odd-numbered gate lines GL1, and GL3, and polarities of data signals are maintained in pre-charge and main charge intervals PC and MC of a gate signal which is applied to each of the even-numbered gate lines GL2, and GL4.

Referring to FIG. 8, polarities Pol of data signals which are applied to the four red pixels R11, R13, R21, and R23 are inverted in each of pre-charge and main charge intervals PC and MC of a corresponding gate signal. The red pixels R11, R13, R21, and R23 have a low data signal charging rate due to the inverted polarities of data signals. In contrast, polarities of data signals which are applied to the four green pixels G12, G14, G32, and G34 are maintained in pre-charge and main charge intervals PC and MC of a gate signal. Accordingly, all the green pixels have a high data signal charging rate. Furthermore, polarities of data signals are maintained for the blue pixels B22, and B24 of four blue pixels B22, B24, B31, and B33 connected to an even-numbered gate line, polarities of data signals are inverted for the blue pixels B31, and B33 connected to an odd-numbered gate line. The blue pixels are divided into pixels having a high data signal charging rate and pixels having a low data signal charging rate.

When data signal charging rates are different, the display panel outputs different levels of luminance from pixels having received the same data signals. In the case where the liquid crystal display panel is a TN panel, when a charging rate is decreased, luminance is increased. As illustrated in FIG. 8, when a charging rate of a data signal in some of the red pixels and blue pixels is lower than that in the green pixels, a color shift to violet may occur throughout the display panel 100. In particular, when the display panel 100 enters a low-temperature state, electron mobility of TFTs of pixels is reduced, and thus a charging rate of the pixels is further decreased.

Figure 9:
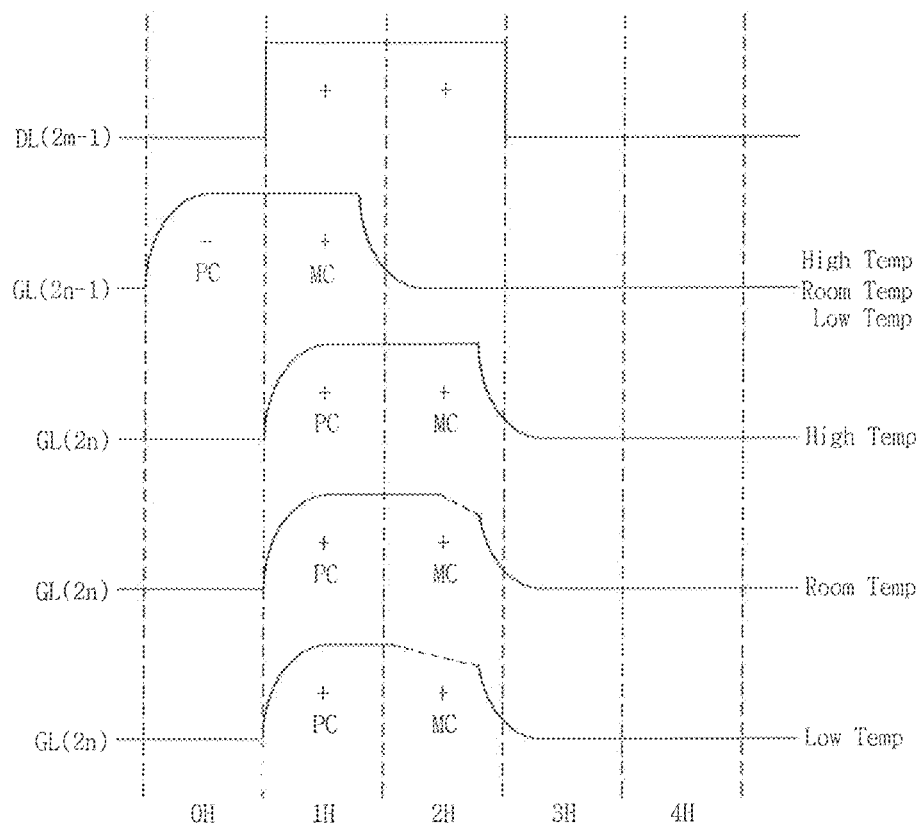
FIG. 9 is a graph illustrating waveforms of gate signals based on temperatures according to an embodiment of the inventive concept.

FIG. 9 is an illustration of waveforms of gate signals based on temperatures according to an embodiment of the inventive concept.

Referring to FIG. 9, when pixels of an odd-numbered data line DL $2m-1$ emit light, data signals having "−, +, +, −, and −" polarities are applied to the odd-numbered data line DL $2m-1$, and a gate signal is applied to an odd-numbered gate line GL $2n-1$. The gate signal which is applied to the odd-numbered gate line GL $2n-1$ is a predetermined signal regardless of a temperature condition.

In contrast, a different gate signal is applied to an even-numbered gate line GL $2n$ depending on the temperature condition. The gate signal may have a lower falling slew rate in a main charge interval MC than in a pre-charge interval PC. A slew rate of a gate signal may be implemented by inserting a floating interval into a gate signal in a rising or falling edge region. The "floating" refers to a state in which transistors constituting output terminals (not illustrated) of a gate drive circuit are all turned off, and also refers to a high impedance state in terms of electricity. A floating state refers to a state in which a connection to a power supply is blocked, and also refers to a state in which supply of current to the gate drive circuit is blocked. A slew rate is a value obtained by dividing voltage by time, which is a variation in voltage per time, i.e., a slope of a pulse signal. When the slew rate is low, a pulse has a waveform with a moderate slope.

In a high-temperature environment High Temp, although polarities of data signals synchronized with pre-charge and main charge intervals PC and MC of a gate signal are inverted, a data signal charging rate of pixels is not considerably decreased. The reason for the data signal charging rate of the pixels not being considerably decreased is that electron mobility of transistors is high in the high-temperature environment High Temp. In the high-temperature environment High Temp, the gate drive circuit may output the same gate signals to the even-numbered gate line GL $2n$ and the odd-numbered gate line GL $2n-1$.

In contrast, in a room-temperature environment Room Temp, when polarities of data signals are inverted in pre-charge and main charge intervals PC and MC of a gate signal, a data signal charging rate of pixels is lower than that of pixels for which polarities are maintained. In the pixel array structure illustrated in FIG. 3, a luminance of pixels connected to the even-numbered gate line GL $2n$ is lower than a luminance of pixels connected to the odd-numbered gate line GL $2n-1$.

The gate drive circuit according to the embodiment of the inventive concept reduces a falling slew rate of a gate signal which is applied to the even-numbered gate line GL $2n$ in a main charge interval MC, as indicated by a dotted line. The gate drive circuit may reduce a data signal charging rate of the pixels connected to even-numbered gate line GL $2n$ by controlling the falling slew rate. As illustrated in FIG. 9, a falling interval of the gate signal in the room-temperature environment Room Temp starts earlier in the main charge interval MC than in the high-temperature environment High Temp. Since application periods of the gate signals area period 1H and the same, the gate signal has a lower falling slew rate in the room-temperature environment Room Temp than in the high-temperature environment High Temp. When the falling interval starts earlier, the transistors of the pixels are turned off, and the pixels are not charged with data signals any longer.

In a low-temperature environment Low Temp, a difference in data signal charging rate between pixels is larger. Referring to FIG. 9, a falling interval of a gate signal in a main charge interval MC starts earlier in the low-temperature environment Low Temp than in the room-temperature and high-temperature environments Room Temp and High Temp. Accordingly, the gate signal in the low-temperature environment Low Temp has a lower falling slew rate than that in the high-temperature environment High Temp. In other words, the pixels of the even-numbered gate line GL $2n$ have a lower charging rate in the low-temperature environment Low Temp than in the room-temperature environment Room Temp and in the high-temperature environment High Temp.

The display panel 100 according to the embodiment of the inventive concept reduces a falling slew rate of gate signals which are applied to pixels connected to the even-numbered gate line GL $2n$ and the odd-numbered gate line GL $2n-1$ in the low-temperature and room-temperature environments. The display panel 100 may eliminate a charging rate deviation and may keep color coordinates uniform by varying the falling slew rate.

Figure 10:
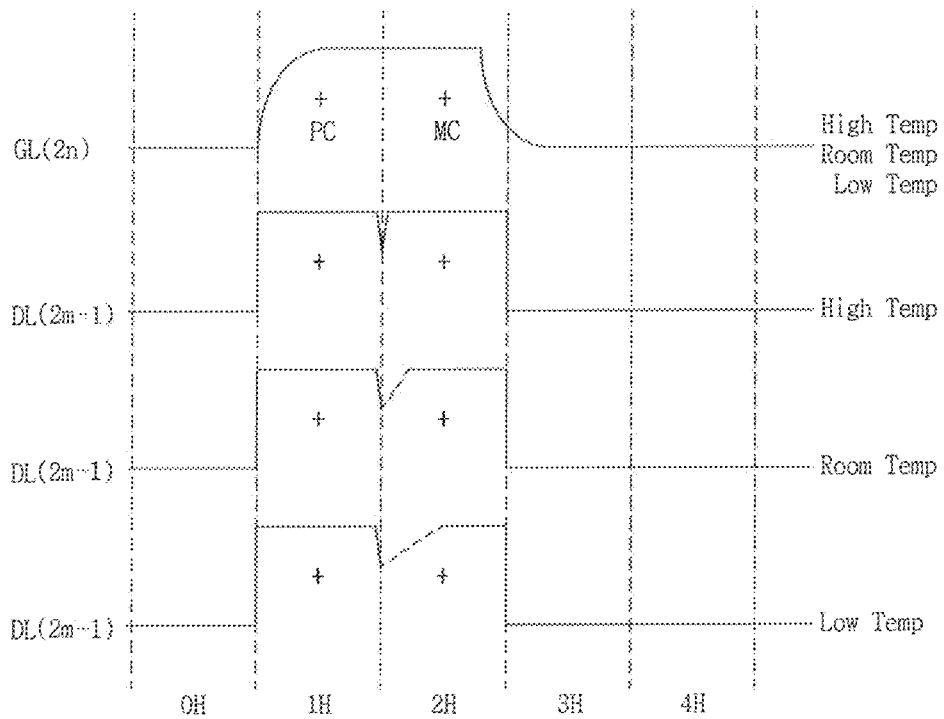
FIG. 10 is a graph illustrating waveforms of data signals based on temperatures according to an embodiment of the inventive concept.

FIG. 10 is a chart illustrating waveforms of data signals based on temperatures according to an embodiment of the inventive concept.

Referring to FIG. 10, gate signals which are applied to an even-numbered gate line GL $2n$ in a high-temperature environment High Temp, a room-temperature environment Room Temp, and a low-temperature environment Low Temp are the same. When polarities of data signals are the same in pre-charge and main charge intervals PC and MC of the gate signals, the data drive circuit outputs data signals having different rising slew rates based on temperatures in a main charge interval MC of an odd-numbered data line DL $2m-1$.

In the high-temperature environment High Temp, the data drive circuit may output predetermined data signals to an even-numbered data line and an odd-numbered data line regardless of polarity conditions of data signals.

In contrast, in the room-temperature environment Room Temp, a difference in charging rate between pixels may occur due to polarities in a pre-charge interval PC and a main charge interval MC. When data signals having the same polarity are applied in pre-charge and main charge intervals PC and MC of the gate signals, the data drive circuit may output a data signal having a low rising slew rate in the main charge interval MC. A data signal charging rate of pixels which have received the data signal having a low rising slew rate is also decreased.

In the low-temperature environment Low Temp, a difference in charging rate between the pixels attributable to polarities of data signals is further increased. When polarities of data signals are the same in the main charge interval MC and the pre-charge interval PC, the data drive circuit outputs a data signal having a lower rising slew rate than that in the room-temperature environment Room Temp or high-temperature environment High Temp.

The data drive circuit reduces a difference in data signal charging rate between pixels by setting a rising slew rate of a data signal to a different value based on a variation in temperature, thereby enabling the display panel to display uniform luminance and color coordinates.

Figure 11:
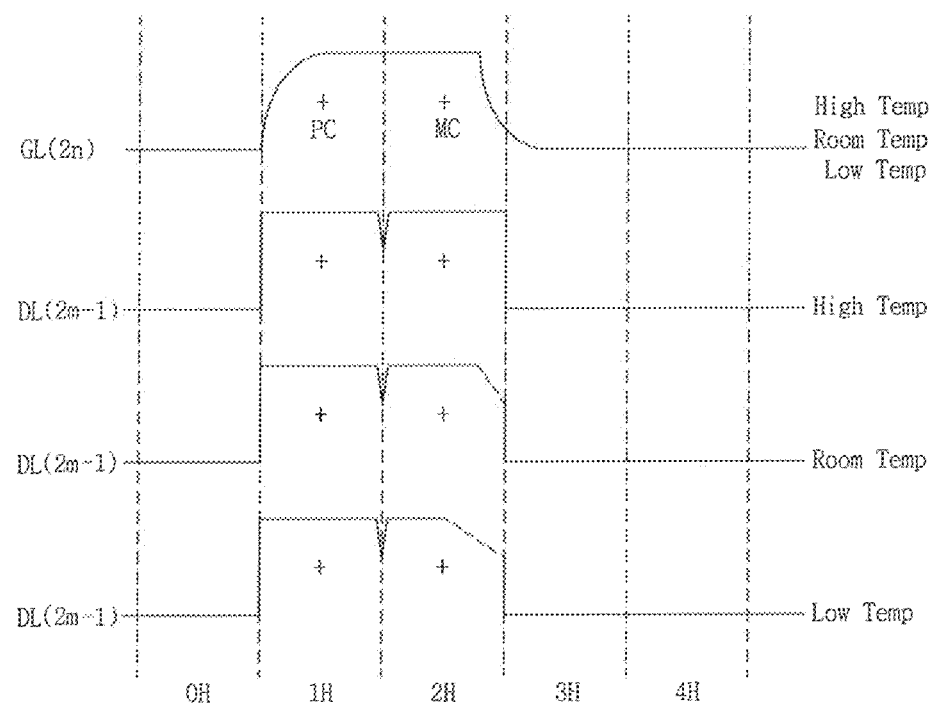
FIG. 11 is a graph illustrating waveforms of data signals based on temperatures according to an embodiment of the inventive concept.

FIG. 11 is a chart illustrating waveforms of data signals based on temperatures according to an embodiment of the inventive concept.

Referring to FIG. 11, the gate drive circuit outputs the same gate signals to an even-numbered gate line GL $2n$ in a high-temperature environment High Temp, a room-temperature environment Room Temp, and a low-temperature environment Low Temp. When polarities of data signals are the same in a pre-charge interval PC and a main charge interval MC, the data drive circuit outputs data signals having different falling slew rates based on temperature conditions in the main charge interval MC.

In the high-temperature environment High Temp, data signals which are applied to an even-numbered data line and an odd-numbered data line are applied under the same conditions regardless of polarities of the data signals.

In contrast, in the room-temperature environment Room Temp, when polarities of data signals are the same in the pre-charge interval PC and the main charge interval MC, the data drive circuit reduces a falling slew rate of the data signal and outputs the data signal having the reduced falling slew rate in the main charge interval MC.

In the low-temperature environment Low Temp, when polarities of data signals are the same in the pre-charge interval PC and the main charge interval MC, the data drive circuit outputs a data signal having a lower falling slew rate than that in the room-temperature environment Room Temp.

The data drive circuit reduces a difference in data signal charging rate between pixels by setting a rising slew rate of a data signal to a different value based on a variation in temperature, thereby enabling the display panel to display uniform luminance and color coordinates.

In FIGS. 9 to 11, there are illustrated embodiments in which the waveforms of the rising and falling intervals are varied by controlling the rising and falling slew rates of the gate signals and the data signals illustrated in the drawings.

Although the individual embodiments are separately applied, it may be possible to apply the embodiments in combination. Although not illustrated in the drawings, the gate drive circuit may vary a falling slew rate of a gate signal, and the data drive circuit may vary a rising slew rate of a data signal.

Figure 12A:
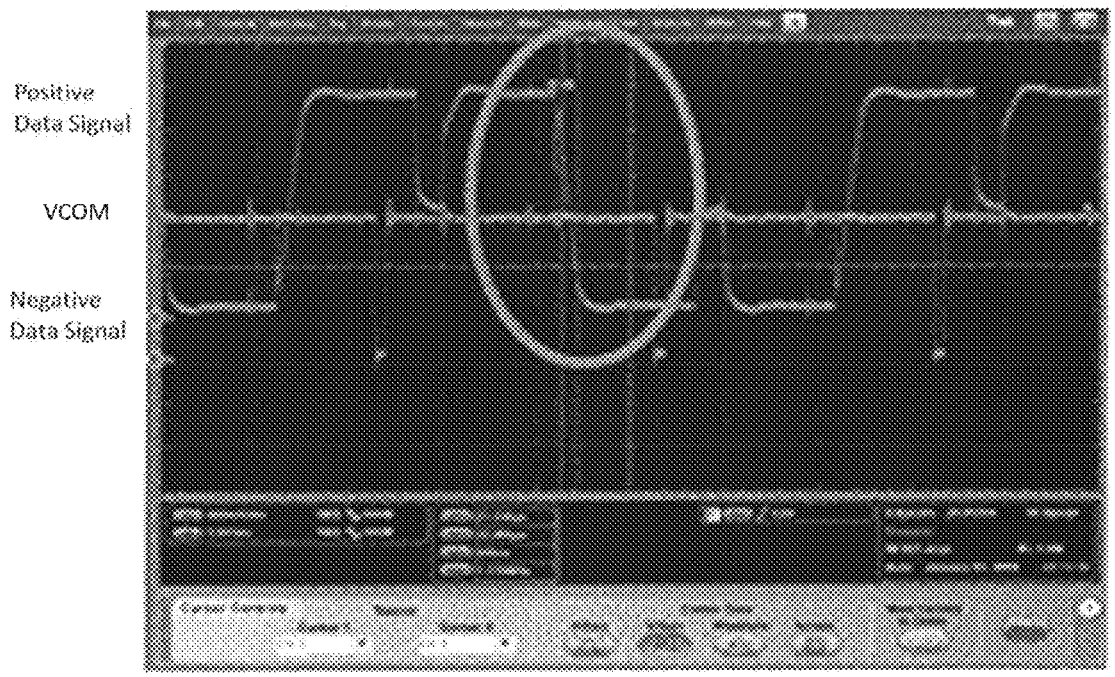
FIG. 12a is a screenshot of a waveform of the conventional inversion driving scheme.

FIG. 12a is a waveform chart of the conventional inversion driving scheme.

Figure 12B:
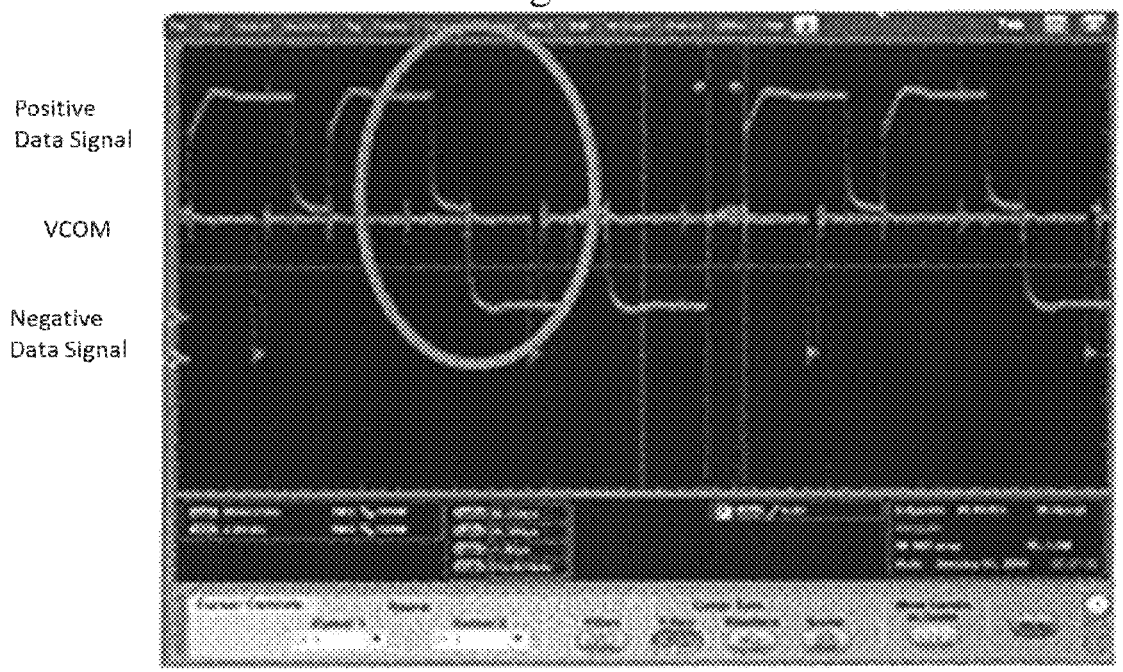
FIG. 12b is a screenshot of a waveform of an inversion driving scheme according to an embodiment of the inventive concept.

FIG. 12b is a waveform chart of an inversion driving scheme according to an embodiment of the inventive concept present disclosure.

Referring to FIG. 12a, a common voltage VCOM is maintained at a uniform voltage magnitude, and data signals include a positive data signal and a negative data signal based on the common voltage VCOM. Each of the positive data signal and the negative data signal is successively applied twice. A rising interval of a negative data signal starts immediately after a falling interval of a positive data signal ends.

Waveforms of FIG. 12b are exemplary implementations of the data signals in the room-temperature environment Room Temp or low-temperature environment Low Temp illustrated in FIG. 11. Referring to FIG. 12b, two positive data signals or negative data signals are successively applied. A second one of the successive data signals, e.g., a data signal corresponding to a main charge interval MC of a gate signal, has a longer period of transition from a high electric potential to a low electric potential VCOM than the previously applied data signal. In other words, the data signal in the main charge interval MC has a lower falling slew rate than the data signal in the pre-charge interval PC.

FIG. 13 is a table illustrating comparisons between power consumption of the conventional inversion driving scheme and power consumption of the driving method according to an embodiment of the inventive concept.

FIG. 13 illustrates comparisons between power consumption of the conventional inversion driving scheme (reference) illustrated in FIG. 12a and power consumption of the inversion driving scheme (inventive concept) according to the embodiment of the inventive concept illustrated in FIG. 12b.

Logic power consumption varies with a pattern of a screen which is displayed on the display panel 100. When a white pattern, a black pattern, and mosaic patterns had been separately driven, power consumption of the conventional inversion driving scheme (reference) and power consumption of the inversion driving scheme (inventive concept) according to the embodiment of the inventive concept were measured and compared with each other.

As illustrated in the table, the power consumption of the inversion driving scheme according to the embodiment of the inventive concept is lower than that of the conventional technology.

Furthermore, power consumption reductions measured based on ENERGY STAR 7.0 (E/S 7.0), which is an international standard, are now described. Based on the power consumption of the conventional inversion driving scheme (reference), a power consumption reduction rate ranging from 0.13 to 5.04% is found. For a mosaic pattern which is a basis for a general screen display state, the inversion driving scheme according to the embodiment of the inventive concept may reduce power consumption by 2.24%.

Figure 14A:
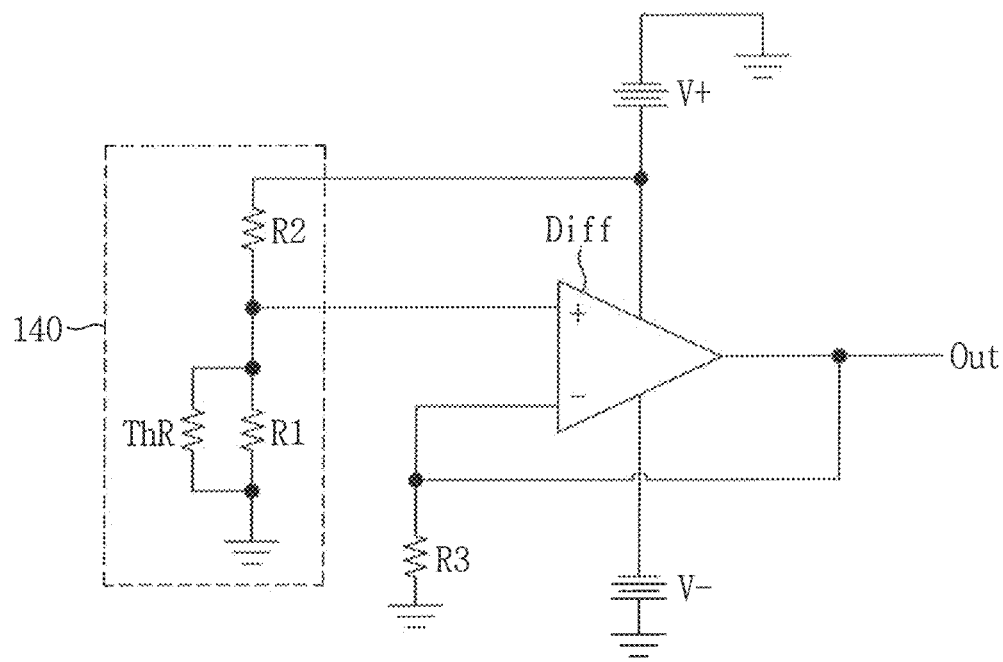
FIG. 14a is a diagram of a slew rate control pulse circuit according to an embodiment of the inventive concept.

FIG. 14a is a diagram of a slew rate control pulse circuit according to an embodiment of the inventive concept.

Figure 14B:
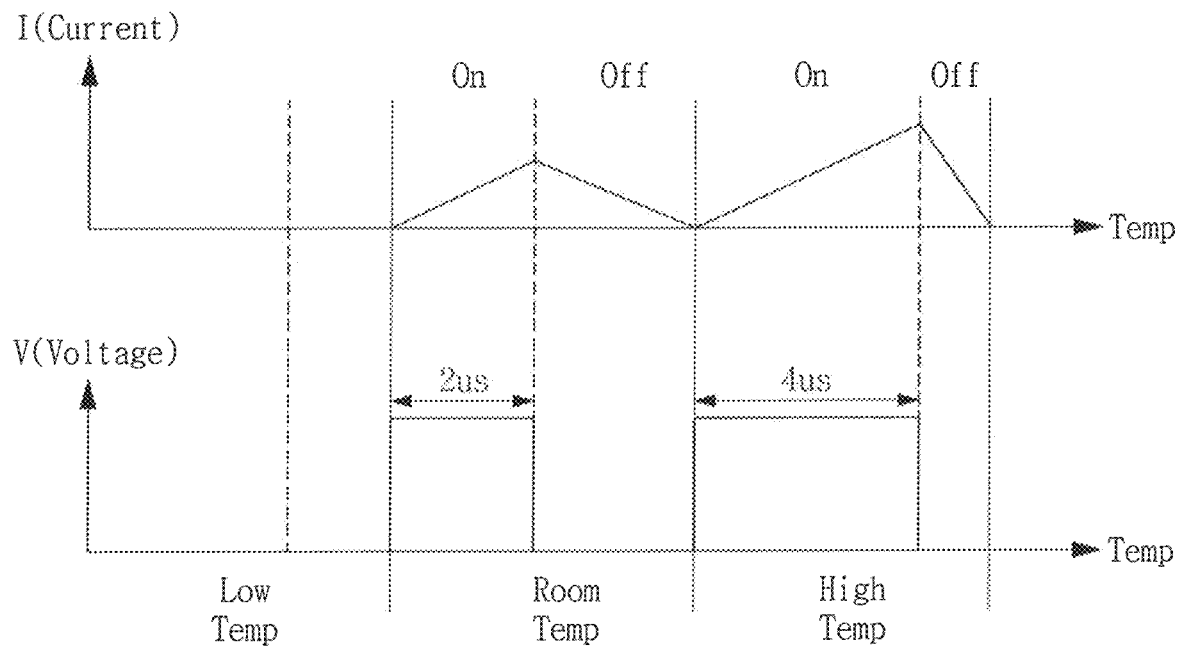
FIG. 14b is an illustration of a waveform of a slew rate control pulse according to an embodiment of the inventive concept.

FIG. 14b is a waveform chart of a slew rate control pulse according to an embodiment of the inventive concept.

Referring to FIG. 14a, a temperature sensor 140 includes a temperature resistor ThRa (e.g. a thermistor) resistance value of which varies with temperature, a first resistor R1 connected in parallel with the thermistor ThR, and a second resistor R2 connected in series with the thermistor ThR and the first resistor R1. This combination permits a temperature-sensitive voltage divider. For example, if the thermistor, for example, based on a high temperature, is a very high value (e.g. 10×R1) the equivalent resistance of the parallel combination of the thermistor and first resistor R1 would approximately approach the value of R1. An output terminal of the temperature sensor 140 is connected to a first input terminal of a differential amplifier Diff. A second input terminal of the differential amplifier Diff is connected to a feedback circuit of an output Out. The differential amplifier Diff is a device which amplifies a difference between input values of the first input terminal and the second input terminal and outputs the amplified difference.

Referring to FIG. 14b, the slew rate control circuit of FIG. 14a varies an output current and a width of a slew rate control pulse representative of a rising interval of the current according to a temperature of the surroundings. The output pulse of FIG. 14b is applied as a slew rate control pulse which blocks a partial interval of an output signal of a gate signal or data signal.

The width of a slew rate control pulse may correlate to an increase in temperature. With continued reference to FIG. 14b, although a slew rate control pulse is not output in a low-temperature environment Low Temp, a slew rate control floating pulse having a width of 2 µs is output in a room-temperature environment Room Temp, and a width of a slew rate control pulse is increased to 4 µs in a high-temperature environment High Temp.

Figure 15:
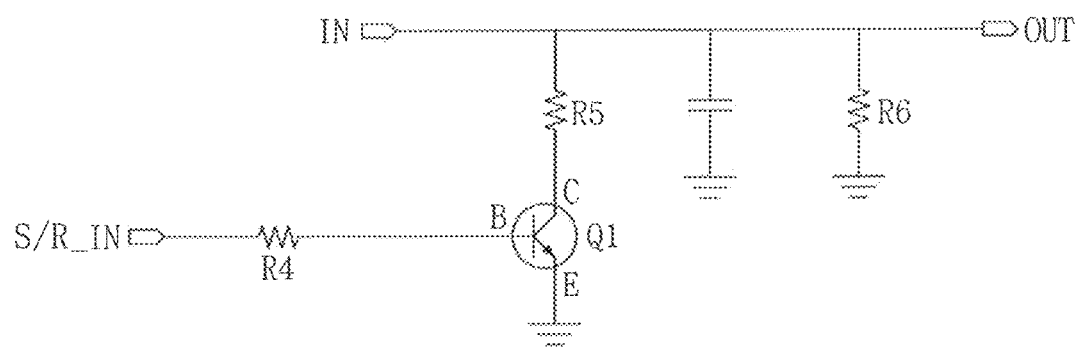
FIG. 15 is a circuit diagram of a signal output circuit according to an embodiment of the inventive concept.

FIG. 15 is a circuit diagram of a signal output circuit.

Referring to FIG. 15, a gate signal or data signal is input to an input terminal IN of the signal output circuit, and is output from an output terminal OUT thereof.

When a slew rate control pulse is not input to a floating input terminal Floating_IN in a high-temperature environment High Temp, a gate signal or data signal has a slight delay, but is output without distortion as a signal identical to the input signal.

When the temperature sensor 140 illustrated in FIG. 14a detects a temperature equal to or higher than a room-temperature Room Temp, a slew rate control pulse is output through the slew rate control circuit output, and is input to a slew rate input terminal S/R_IN. When a slew rate control pulse is input in a room-temperature environment Room Temp or low-temperature environment Low Temp, a transistor Q1 is turned on. An output terminal of the gate signal or data signal may be connected to a ground power supply GND by the turned-on transistor Q1. An impedance of the ground power supply GND is lower than that of the output terminal OUT, and thus the input gate signal or data signal cannot be output through the output terminal OUT.

In other words, an ON signal of the slew rate control pulse can block an output of the gate signal or data signal. Although the transistor Q1 is illustrated as an example of a switching device in FIG. 15, other switching devices including an FET may be used as the switching device.

The slew rate control circuit and signal output circuit illustrated in FIG. 14a or 15 may be included in the timing controller 130.

FIG. 16 is a flowchart providing an overview of operation of the inventive concept. The operation may be performed, for example, with a display device 10 having hardware circuitry such as shown in FIG. 1.

At operation S1600, a liquid crystal display may be provided such as shown in FIG. 1. For example, a substrate of a display panel may have a plurality of gates lines disposed on thereon that extend in a first direction, and a plurality of gate lines disposed on the substrate so as to cross the data lines and extend in a second direction that intersects the first direction. A plurality of pixels are connected to the data lines and the gate lines. The data lines are connected to a data drive circuit 110, and the gate lines are connected to a gate drive circuit 120. The data drive circuit receives control signals from the timing controller 130, and also receives RGB' data (as shown in FIG. 1). The data drive circuit 110 applies data signals to the data lines. The gate drive circuit applies gate signals to the gate lines, each gate signal including a pre-charge interval and a main charge interval for charging pixels connected thereto.

With continued reference to FIG. 16 and FIG. 1, it can be seen there is a temperature sensor 140 connected to the timing controller 130. The temperature sensor 140 has circuitry to detect a surrounding temperature. At operation S1610, the temperature sensor 140 detects the surrounding temperature. This information is provided, for example, to the timing controller 130 (the timing controller including circuitry configured for operation).

At operation S1620, the timing controller 130 compares the surrounding temperature detected by the temperature sensor with a reference temperature, to determine whether the detected temperature is less than the reference temperature.

If the detected temperature is less than the reference temperature, the timing controller 130 takes corrective action to provide for a more uniform charging rate of the pixels, because the gate signals may have a lower falling slew rate when the detected temperature is less than the reference temperature. For example, when the gate signal has a lower falling slew rate, the transistors of the pixels are turned off, and the pixels may not be sufficiently charged with data signals. Thus, the pixels will have a lower charging rate.

At operation S1630, when the temperature detected by the temperature sensor is less than the reference temperature, the timing controller may control the data drive circuit to reduce a difference in data signal charging rates by varying at least one of a rising slew rate and a falling slew rate of a data signal corresponding to the main charge interval of each of the signals based on the detected temperature. The reference temperature may be obtained from a storage in the timing controller 130 (e.g. such as a cache storage), or in a memory connected to the timing controller 130. There may be a table that provides information regarding the varying of slew rates of a data signal based on the detected temperature.

In the event that the detected temperature is not less than the reference temperature, the operation periodically repeat operations S1610 and S1620, or may end if there is no more images to be displayed by the pixels. In addition, the temperature sensor may detect temperatures that are provided, for example, to the controller to compares with a reference so as to determine whether the environment is a low temperature (Low Temp) environment, a room temperature (Room Temp) environment, or a high temperature (High Temp) environment.

According to the embodiments of the inventive concept, there is provided the liquid crystal display device including the data lines disposed between adjacent pixels and pixels configured to be driven based on locations thereof according to an inversion driving scheme, wherein gate signals are each configured to include a pre-charge interval and a main charge interval, and a falling slew rate is set to a lower value in the main charge interval of each of the gate signals to be applied to the liquid crystal display device or a rising slew rate or falling slew rate is set to a lower value in a data signal corresponding to the main charge interval, thereby enabling the pixels to be uniformly charged with data signals.

While the inventive concept has been illustrated and described with reference to the embodiments thereof, it will be apparent to those of ordinary skill in the art that various changes in form and detail may be made thereto without departing from the spirit and scope of the appended claims.

What is claimed is:

1. A liquid crystal display (LCD) device, comprising:
   a substrate;
   a plurality of gate lines disposed on the substrate, and extending in a first direction;
   a plurality of data lines disposed on the substrate, and extending in a second direction which intersects the first direction;
   a plurality of LCD pixels connected to the gate lines and the data lines;
   a data drive circuit configured to apply data signals to the plurality of data lines, each of the data signals having a positive polarity or negative polarity with respect to a predetermined voltage;
   a gate drive circuit configured to supply gate signals, each gate signal including a pre-charge interval and a main charge interval, to the plurality of gate lines; and
   a temperature sensor configured to detect a temperature of surroundings;
   wherein the data drive circuit varies at least any one of a rising slew rate and a falling slew rate of a first data signal corresponding to the main charge interval of each of the gate signals, based on the temperature detected by the temperature sensor and based on a polarity of the first data signal and a polarity of a second data signal corresponding to the pre-charge interval of each of the gate signals.

2. The liquid crystal display device according to claim 1, further comprising:
a timing controller configured to apply control signals to the data drive circuit and the gate drive circuit, the control signals includes a slew rate control pulse that controls the data drive circuit to vary any one of the rising slew rate and the falling slew rate of the first data signal corresponding to the main charge interval of each of the gate signals.

3. The liquid crystal display device according to claim 1, wherein:
the plurality of pixels form a j×k array (where j and k are positive integers), a number of data lines is j/2, and a number of gate lines is 2k; and
some of the plurality of pixels forming the j×k array are arranged in the first direction in which the plurality of gate lines extend, and some adjacent ones of the plurality of pixels receive data signals from a corresponding one of the plurality of data lines.

4. A liquid crystal display device, comprising:
a substrate;
a plurality of gate lines disposed on the substrate, and extending in a first direction;
a plurality of data lines disposed on the substrate, and extending in a second direction which intersects the first direction;
a plurality of pixels connected to the gate lines and the data lines;
a data drive circuit configured to apply data signals to the plurality of data lines, each of the data signals having a positive polarity or negative polarity with respect to a predetermined voltage;
a gate drive circuit configured to supply gate signals, each gate signal including a pre-charge interval and a main charge interval, to the plurality of gate lines; and
a temperature sensor configured to detect a temperature of surroundings; wherein:
the data drive circuit varies at least any one of a rising slew rate and a falling slew rate of a data signal corresponding to the main charge interval of each of the gate signals based on the temperature detected by the temperature sensor;
the plurality of pixels forms a j×k array (where j and k are positive integers), a number of data lines is j/2, and a number of gate lines is 2k;
some of the plurality of pixels forming the j×k array are arranged in the first direction in which the plurality of gate lines extend, and some adjacent ones of the plurality of pixels receive data signals from a corresponding one of the plurality of data lines;
the pixels forming the j×k array are arranged in the second direction in which the plurality of data lines extend;
every two or more of the plurality of gate lines are disposed between the pixels arranged in the second direction in which the plurality of data lines extend; and
each of the gate lines applies gate signals to adjacent ones of the pixels.

5. The liquid crystal display device according to claim 4, wherein the data drive circuit is configured to operate an inversion driving scheme in which two positive data signals or two negative data signals are successively applied, in which a second one of the successively applied data signals has a longer period of transition from a high electric potential to a low electric potential than a first one of the successively applied data signals.

6. The liquid crystal display device according to claim 4, wherein when the temperature detected by the temperature sensor is lower than a reference temperature, the data drive circuit outputs a data signal having a rising slew rate that is lower than a rising slew rate of the reference temperature in the main charge interval.

7. The liquid crystal display device according to claim 4, wherein when the temperature detected by the temperature sensor is lower than a reference temperature, the data drive circuit outputs a data signal having a falling slew rate lower than a falling slew rate of the reference temperature in the main charge interval.

8. The liquid crystal display device according to claim 6, wherein when the temperature detected by the temperature sensor is lower than the reference temperature, the data drive circuit outputs a data signal having a falling slew rate lower than a falling slew rate of the reference temperature in the main charge interval.

9. The liquid crystal display device according to claim 8, wherein the rising slew rate and the falling slew rate have different values.

10. A liquid crystal display (LCD) device comprising:
a substrate;
a plurality of gate lines disposed on the substrate, and extending in a first direction;
a plurality of data lines disposed on the substrate, and extending in a second direction which intersects the first direction;
a plurality of LCD pixels connected to the gate lines and the data lines;
a data drive circuit configured to apply data signals to the plurality of data lines, each of the data signals having a positive polarity or negative polarity with respect to a predetermined voltage;
a gate drive circuit configured to supply gate signals to the plurality of gate lines, each of the gate signals including a pre-charge interval and a main charge interval; and
a temperature sensor configured to detect a temperature of surroundings;
wherein the gate drive circuit is configured to vary a falling slew rate of a gate signal corresponding to the main charge interval of each of the gate signals, based on the temperature detected by the temperature sensor and based on a polarity of the first data signal corresponding to the main charge interval of each of the gate signals and a polarity of a second data signal corresponding to the pre-charge interval of each of the gate signals.

11. The liquid crystal display device according to claim 10, wherein:
when a resolution of the plurality of pixels of the liquid crystal display device is j×k (where j and k are positive integers), a number of data lines is j/2, and a number of gate lines is 2k;
the plurality of pixels comprise red pixels, green pixels, and blue pixels; and
the pixels are arranged in the first direction in which the gate lines extend, and some adjacent ones of the pixels receive data signals from a corresponding one of the data lines.

12. A liquid crystal display device comprising:
a substrate;
a plurality of gate lines disposed on the substrate and extending in a first direction;
a plurality of data lines disposed on the substrate, and extending in a second direction which intersects the first direction;

a plurality of pixels connected to the gate lines and the data lines;

a data drive circuit configured to apply data signals to the plurality of data lines, each of the data signals having a positive polarity or negative polarity with respect to a predetermined voltage;

a gate drive circuit configured to supply gate signals to the plurality of gate lines, each of the gate signals including a pre-charge interval and a main charge interval; and a temperature sensor configured to detect a temperature of surroundings; wherein:

the gate drive circuit is configured to vary a falling slew rate of a gate signal corresponding to the main charge interval of each of the gate signals based on the temperature detected by the temperature sensor;

when a resolution of the plurality of pixels of the liquid crystal display device is j×k (where j and k are positive integers), a number of data lines is j/2, and a number of gate lines is 2k;

the plurality of pixels comprises red pixels, green pixels, and blue pixels;

the pixels are arranged in the first direction in which the gate lines extend, and some adjacent ones of the pixels receive data signals from a corresponding one of the data lines;

the pixels are arranged in the second direction in which the data lines extend;

every two of the gate lines are disposed between the pixels arranged in the second direction in which the data lines extend; and each of the gate lines applies gate signals to adjacent ones of the pixels.

13. The liquid crystal display device according to claim 12, wherein when the temperature detected by the temperature sensor is lower than a reference temperature, the gate drive circuit outputs a gate signal having a falling slew rate lower than a falling slew rate of the reference temperature in the main charge interval.

14. The liquid crystal display device according to claim 13, wherein the gate drive circuit outputs a gate signal having a falling slew rate which decreases as the temperature detected by the temperature sensor is lower.

15. The liquid crystal display device according to claim 14, wherein the data drive circuit outputs a data signal having a rising slew rate lower than a rising slew rate of the reference temperature in the main charge interval of the gate signal.

16. The liquid crystal display device according to claim 10, wherein the temperature sensor includes a Resistance Temperature Detector (RTD), comprising a metal resistor.

17. A liquid crystal display device comprising:
a substrate;
a plurality of gate lines disposed on the substrate, and extending in a first direction;
a plurality of data lines disposed on the substrate, and extending in a second direction which intersects the first direction, the plurality of data lines being insulated electrically from the plurality of gate lines;
a data drive circuit configured to apply data signals to the plurality of data lines, each of the data signals having a positive polarity or negative polarity with respect to a predetermined voltage;
a gate drive circuit configured to supply gate signals to the plurality of gate lines, each of the gate signals including a pre-charge interval and a main charge interval; and
a timing controller configured to apply control signals to the data drive circuit and the gate drive circuit; and
a temperature sensor comprising a resistor having a resistance value which varies with a temperature, the temperature sensor configured to detect a temperature of surroundings, and to transmit the detected temperature to the timing controller;
wherein the timing controller further comprises:
a floating circuit comprising a differential amplifier configured to receive a voltage determined based on the resistance value and to output a slew rate control pulse; and
a signal output circuit configured to block an output of a gate signal or data signal which overlaps output of the slew rate control pulse.

18. The liquid crystal display device according to claim 17, wherein:
the differential amplifier comprises at least two input terminals and one output terminal; and
one of the input terminals is connected to the temperature sensor, and a remaining one of the input terminals is connected to the output terminal in a feedback arrangement.

19. The liquid crystal display device according to claim 18, wherein:
the signal output circuit comprises a switching device connected to an output terminal for the gate signal or data signal; and
a first terminal of the switching device receives the slew rate control pulse, and a second terminal of the switching device is connected to the output terminal for the gate signal or data signal, and a third terminal of the switching device is connected to a ground power supply.

20. The liquid crystal display device according to claim 17, wherein the data drive circuit is configured to operate an inversion driving scheme in which two positive data signals or two negative data signals are successively applied, in which a second one of the successively applied data signals has a longer period of transition from a high electric potential to a low electric potential than a first one of the successively applied data signals.

* * * * *